H. T. MAITLAND.
PROCESS OF REFINING HYDROCARBON OILS.
APPLICATION FILED JAN. 13, 1916.
1,272,979.
Patented July 16, 1918.
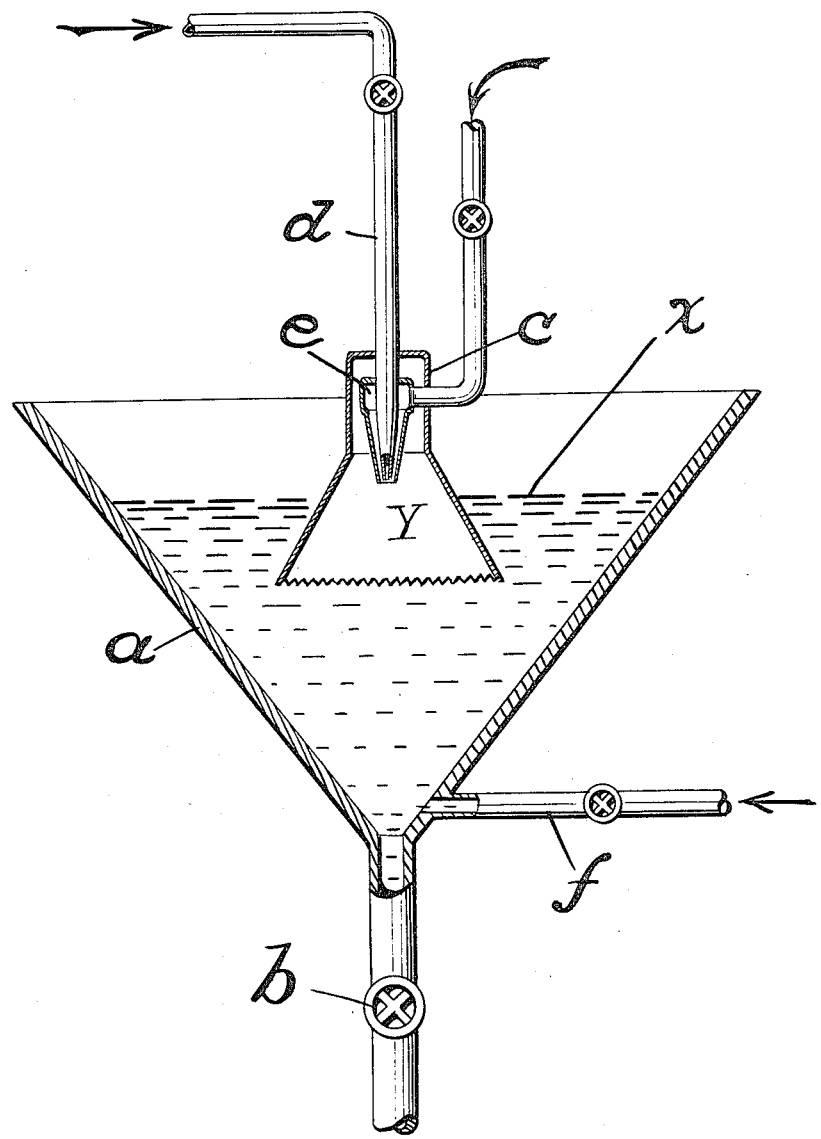
WITNESS:
Robt. R. Kitchel.
INVENTOR
Harold T. Maitland
BY
Frank S. Busser
ATTORNEY.

UNITED STATES PATENT OFFICE.

HAROLD T. MAITLAND, OF MARCUS HOOK, PENNSYLVANIA, ASSIGNOR TO SUN COMPANY, OF PHILADELPHIA, PENNSYLVANIA, A CORPORATION OF NEW JERSEY.

PROCESS OF REFINING HYDROCARBON OILS.

1,272,979.                    Specification of Letters Patent.    Patented July 16, 1918.

Application filed January 13, 1916. Serial No. 71,849.

*To all whom it may concern:*

Be it known that I, HAROLD T. MAITLAND, a citizen of the United States, residing at Marcus Hook, county of Delaware, and State of Pennsylvania, have invented a new and useful Improvement in Processes of Refining Hydrocarbon Oils, of which the following is a full, clear, and exact description, reference being had to the accompanying drawings, which form a part of this specification.

In the refining of petroleum oil distillates, and petroleum oil stocks or reduced distillates, it is customary to add to the same, sulfuric acid in an amount dependent upon the character of the distillate, or stocks or reduced distillates, thoroughly mix the oil and acid by agitation and allow the mixture to settle. The result of this treatment is to cause the acid, which has a special affinity for the unsaturated hydrocarbons and other compounds, to combine, react, or coalesce with these impurities and form resins, or sulfonic compounds, which settle to the bottom of the mixing tank as a sludge acid.

This process is expensive owing to the large amount of acid required. Whether the sulfuric acid is brought into contact with the oil by either of the usual methods—agitation with air or mechanical agitation—there is no doubt that every particle of the acid does not combine, react or coalesce with the impurities, but that, on the contrary much of the acid is not effective, on account of not having come into intimate contact with distillate or stock, or reduced distillates, and is therefore wasted.

Prolonged experiment and analysis has convinced me that the action of the sulfuric acid (which is not miscible with the oil) upon the unsaturated hydrocarbons, is largely, if not wholly, superficial. That is, the acid, when agitated with the oil, is divided into a large number of particles, many of which are quite large and which are quite visible to the naked eye; and these particles act, not to absorb or react with the impurities which it is desired to remove, but to catch them and hold them upon their surfaces. In other words, the impurities do not either combine with or penetrate the entire mass of the acid, and the effective action of a large portion of the acid is therefore lost.

The object of my invention is to effectively utilize practically all the acid, to which end my invention consists in subdividing the acid mixed with the oil into a much larger number of units, thereby multiplying the combined area of the particles composing a given volume or weight of the liquid acid and thus multiplying or greatly increasing the efficiency of the acid.

The process may be carried out in different ways, but in the accompanying drawing I show, in vertical section, an illustrative apparatus which is adapted to carry out the process on a small scale.

$a$ is a funnel shaped tank having a discharge closed by a stopper $b$. $c$ is a bell-mouthed vessel adapted to be inserted in the tank substantially below the level of the liquid $x$ therein. Within the vessel $c$ is an injector, or vaporizer, the same comprising an inner tube $d$ adapted to contain acid and having a small opening for the discharge of the acid and a surrounding concentric tube $e$ having an annular opening directed in front of the discharge opening in the acid pipe. $f$ is an air pipe which extends into the bottom of the tank.

The vessel $c$ being inserted in the tank below the level of the oil, displaces the oil and forms an inclosed space $y$ beneath the injector or vaporizer. Compressed air is then forced out the tube $e$, which vaporizes the acid into numerous particles so minute as to form a mist or cloud of acid vapor which, after entirely filling the space $y$, is forced into the body of oil, and escapes around the rim of the mouth of the bell and rises in the oil. Air concurrently introduced through the pipe $f$ effects a thorough agitation and mixing of the acid and oil.

It has been found that by this treatment a much smaller quantity of acid is necessary to effect the removal of impurities to the degree required than is necessary where the acid is introduced in the ordinary way. For example, we may start with Texas crude oil having a weight of about $20\frac{1}{2}°$ Baumé gravity when taken at 60° F., distil off the lighter products and later, at a higher temperature, distil off the heavier products or lubricating oils. To one barrel (42 gallons) of this heavier distillate is added about 15 pounds of sulfuric acid, the same being added in the form of very finely divided particles, as hereinbefore explained. Of course, the amount of sulfuric acid necessary to be added will vary, within wide limits, with the character of oil being treated.

It has been found that the amount of sulfuric acid necessary to use, when introduced in a liquid stream, to accomplish a degree of purification and precipitation comparable with that effected by my improved process, very greatly exceeds the amount used in my improved process, thus greatly reducing the refining expense.

Having now fully described my invention, what I claim and desire to protect by Letters Patent is:

1. The process of refining oils which consists in creating a spray of gas and of sulfuric acid in a finely divided state approximating a mist of vapor the separate particles of which are substantially smaller than those which naturally form by agitation of oil and acid mechanically or by air, and forcibly directing said spray, within a confined space outside that occupied by the body of oil, toward the level of the oil.

2. The process of refining oils which consists in vaporizing a flowing stream of acid by means of a surrounding flowing stream of gas serving to break up the acid into an extremely finely divided state and forcibly directing the same into a space outside of that occupied by the body of oil and toward the level of the oil.

3. The process of refining oils which consists in vaporizing a flowing stream of acid by means of a surrounding flowing stream of gas serving to break up the acid into an extremely finely divided state and forcibly directing the same into a space outside of that occupied by the body of oil and toward the level of the oil, and independently agitating the body of oil to insure a thorough distribution of the acid particles which by gaseous pressure are forced below its surface.

In testimony of which invention, I have hereunto set my hand, at Marcus Hook, Pa., on this 8th day of Jan'y, 1916.

HAROLD T. MAITLAND.

Witnesses:
BENJ. JOHNSON, Jr.,
M. EDITH JOHNSON.